(12) United States Patent
Miller

(10) Patent No.: US 7,676,632 B2
(45) Date of Patent: Mar. 9, 2010

(54) PARTIAL CACHE WAY LOCKING

(75) Inventor: William V. Miller, Arlington, TX (US)

(73) Assignee: VIA Technologies, Inc., Hsin-Tien, Taipei (TW)

(*) Notice: Subject to any disclaimer, the term of this patent is extended or adjusted under 35 U.S.C. 154(b) by 487 days.

(21) Appl. No.: 11/470,304

(22) Filed: Sep. 6, 2006

(65) Prior Publication Data
US 2008/0022046 A1    Jan. 24, 2008

Related U.S. Application Data

(60) Provisional application No. 60/807,653, filed on Jul. 18, 2006.

(51) Int. Cl.
*G06F 13/00* (2006.01)

(52) U.S. Cl. ............... 711/128; 711/133; 711/134; 711/145

(58) Field of Classification Search ............ 711/128, 711/133, 134, 145
See application file for complete search history.

(56) References Cited

U.S. PATENT DOCUMENTS 6,823,426 B2 * 11/2004 Goldschmidt et al. ....... 711/134
2006/0036811 A1 * 2/2006 Dieffenderfer et al. ...... 711/136
2006/0179228 A1 * 8/2006 Thompson et al. .......... 711/129
2006/0179230 A1 * 8/2006 Fields et al. ................ 711/129
2007/0067574 A1 * 3/2007 Stempel et al. ............. 711/129

OTHER PUBLICATIONS

Chen, Z.L.; "Research for the Cache Architecture of Embedded Processor;" Department of Computer Science and Engineering; Fudan University; vol. 25, No. 7; Jul. 2004; pp. 1204-1206—Abstract only.

* cited by examiner

*Primary Examiner*—Reba I Elmore
(74) *Attorney, Agent, or Firm*—Thomas, Kayden, Horstemeyer & Risley

(57) ABSTRACT

Systems and methods are disclosed for locking code in cache. A processor comprises a cache and a cache controller. The cache is configured to store a temporary copy of code residing in main memory. Also, the cache is divided into a number of cache ways, where each cache way is further divided into a number of cache way portions. The cache controller is configured to utilize a first signal and a second signal. The first signal designates one of the cache ways as a partial cache way and the second signal defines which ones of the cache way portions of the partial cache way are to be locked.

20 Claims, 5 Drawing Sheets

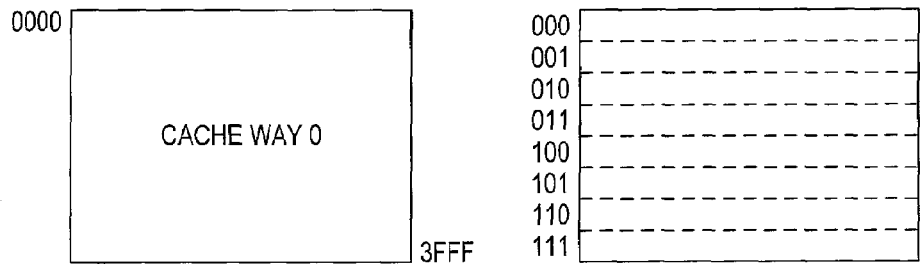
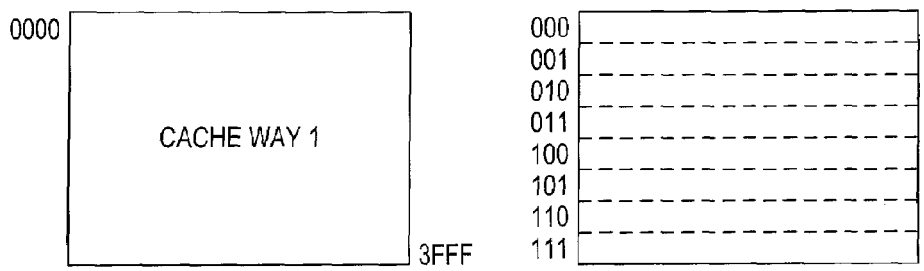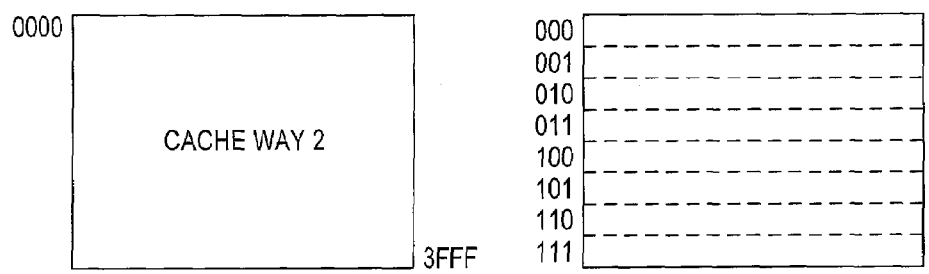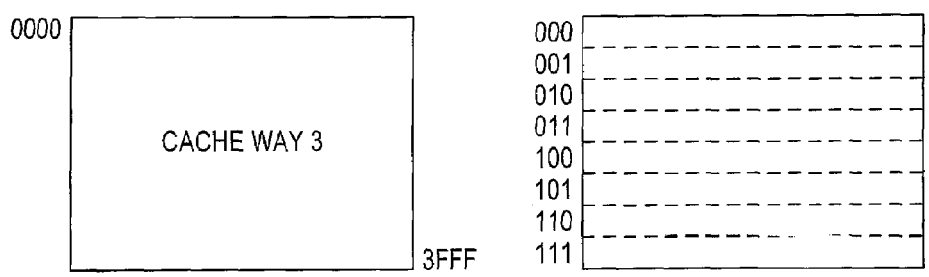
FIG. 5A  FIG. 5B
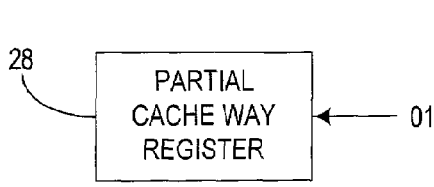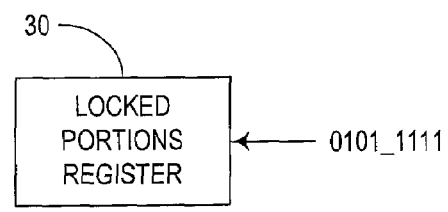
FIG. 5C  FIG. 5D

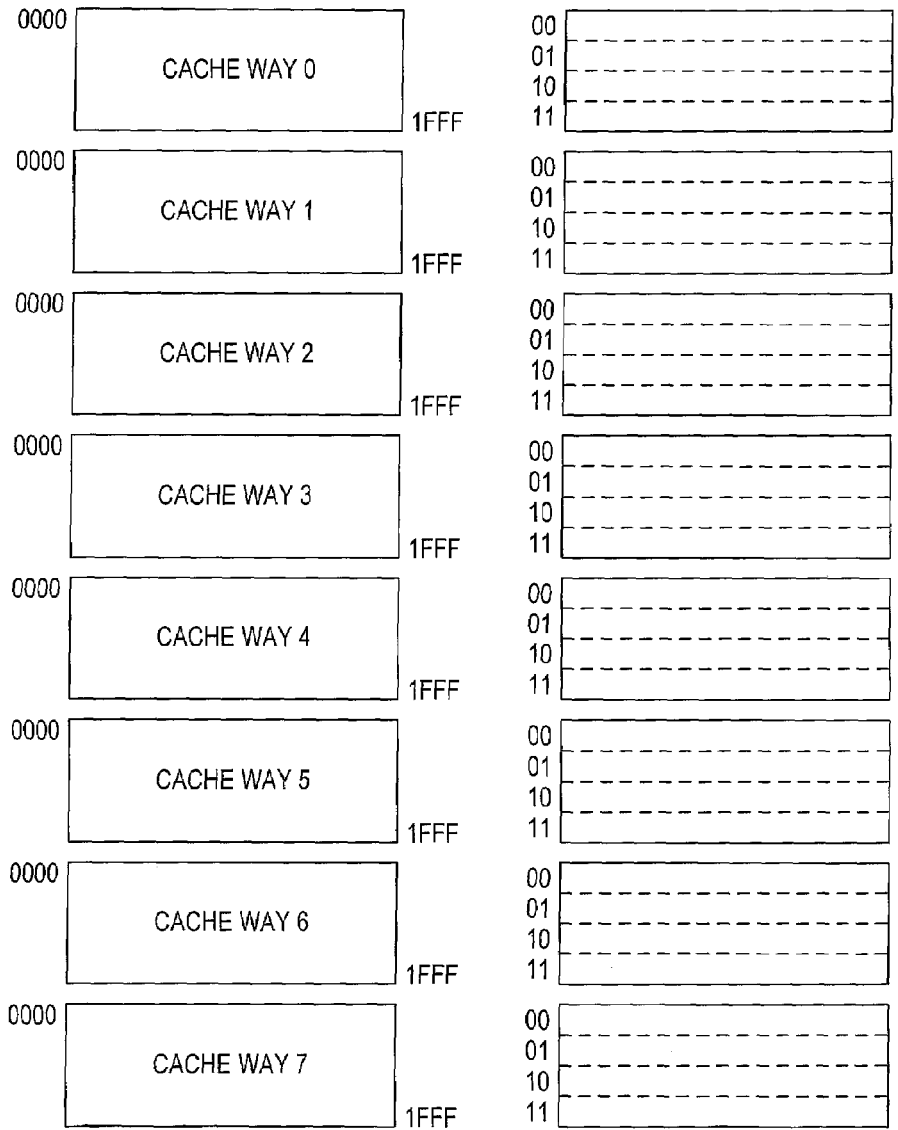
FIG. 6A   FIG. 6B
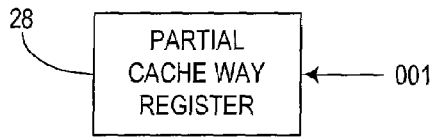
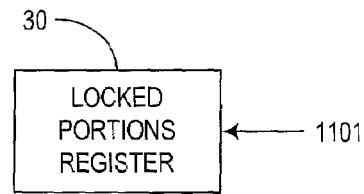
FIG. 6C   FIG. 6D

PARTIAL CACHE WAY LOCKING

CROSS REFERENCE TO RELATED APPLICATION

This application claims the benefit of U.S. provisional application Ser. No. 60/807,653,filed Jul. 18, 2006, the contents of which are incorporated by reference herein.

TECHNICAL FIELD

The present disclosure broadly relates to processors. More particularly, the disclosure relates to cache memory and corresponding systems and methods for locking portions of cache.

BACKGROUND

Circuit designers strive to increase the operational speed of processors by reducing the time that stored data and/or instructions are accessed from memory locations. One way to speed up a processor's access of stored code is to use cache memory for temporarily storing a duplicate copy of the code that the processor has recently retrieved from main memory. Since software programs tend to loop and thus access the same locations in memory over and over, it has been known in the art to incorporate some type of cache system in communication with the processor for making the needed code more quickly accessible. When the processor requests code that resides in the cache, which is a "cache hit", the code can be retrieved much more quickly than if the code does not reside in the cache, which is a "cache miss". For a cache miss, the processor is required to retrieve the code from main memory, which may take as much as one hundred times longer than accessing code from cache.

Cache is controlled by a cache controller that typically includes algorithms for determining which code to store. When new code is retrieved from main memory and is to be allocated into the cache, an allocation algorithm determines what existing code needs to be evicted from the cache. Allocation algorithms typically work under the concept of statistical probability to determine which code might likely be needed next. For example, a "round-robin" approach simply evicts code from the next location based on a predetermined order. A "least recently used" methodology is a more sophisticated approach, which keeps track of when each cache line is entered into cache and evicts the oldest code.

In response to the processor making a request for code, the cache controller checks to see if the code is already in the cache. This is done by comparing the address of the requested code with the addresses in cache. For example, the address of a 4K-byte cache typically includes 32 bits, where 20 bits (address [31:12]) are "tag" bits and 12 bits (address [11:0]) are "offset" bits. The tag bits, which are stored off into a separate tag cache, identify which one of $2^{20}$ cache lines from main memory are stored in a given cache address. The 12 offset bits indicate where the code will be stored in the $2^{12}$-byte (4K) cache.

The cache controller utilizes the offset bits depending on the architecture of the cache. For instance, one type of cache is configured as "direct map" cache. With direct map cache, code with a particular offset can be stored in only one location in the cache. For example, suppose that a 32 byte cache line having an address range from 0000_0700 (hex) to 0000_071F (hex) is stored in offset addresses 700 to 71F in the cache and suppose a second cache line has an address range from 1234_5700 to 1234_571F. This second cache line can not be stored simultaneously with the first cache line since the two cache lines have conflicting offset addresses 700 to 71F. It is likely that these conflicts occur simply because of the random nature in which code is compiled.

Because of this problem with direct map caches, it has been known to create cache having a "set-associative" architecture. A "two-way" set-associative cache, for example, includes a configuration where the entire cache is divided into two equally sized "cache ways". An extra bit, typically taken from the most significant bit of the offset address, is used to indicate in which one of the two cache ways a particular cache line is stored. An algorithm can be used to interpret this extra bit to determine where the cache line is stored. Alternatively, the tag addresses can be compared to detect if a cache line is stored in the first or second cache way.

Cache can be divided into any number of parts. For instance, "four-way" set-associative caches having four cache ways and "eight-way" set-associative caches having eight cache ways are common. By allowing cache lines having conflicting offsets to be stored simultaneously in separate cache ways, the cache hit rate can be increased. It has been discovered that the hit rate with a direct-map cache might be a reasonable 65%. However, this hit rate can be raised to about 90% by using a four-way set-associative cache, thereby significantly increasing the processor access speed. Since code addresses tend to have conflicting offsets, it is usually better to use a cache configuration that has more cache ways.

However, taken to an extreme, the cache can be configured such that any cache line can be stored anywhere in the cache. This type of fully set-associative cache is typically referred to as a "content accessible memory" or "CAM". However, for proper operation, CAM requires a large number of comparators and associated logic, which ultimately results in slower access times. It has therefore been discovered that four-way and eight-way set-associative caches, which only requires four or eight comparisons, respectively, normally provide the best code access performance.

Attention is drawn again to the allocation algorithms of cache controllers. Unfortunately, one of the limitations of industry standard allocation algorithms is that, while they provide statistically better performance on average, they may not necessarily provide optimal performance for system critical tasks at all times. Many tasks that a processor performs might not be time critical, while other tasks, such as "real-time" tasks, might require fast handling. As a result, software is typically written such that critical real-time tasks interrupt other tasks. Then, once the interrupt has completed, the software may return to the non-critical tasks to continue normal processing.

Interrupts or real-time tasks may not necessarily run very often, but when they are run, it is desirable that they be run quickly. As an example, suppose an interrupt routine is created for a cellular phone to generate a ringing signal when a call is received. Although this interrupt may only occur a few times a day, when it happens, it should be run quickly since it is a real time event. The phone may be running background tasks when a call is received, but the ringing interrupt takes priority. One solution for quickly running interrupts or other high-priority code has been to load this code in cache and then "lock" it in the cache so that it will not be evicted. This, of course, improves the latency of these interrupt routines. It is therefore beneficial to guarantee that access to the interrupt routine will hit in the cache in order to provide quick execution. Conventional allocation algorithms normally are not sophisticated enough, however, to know which code is high priority. Therefore, a software expert may recognize that certain portions of code should take priority over other code such that it can be locked and available in the cache at all times.

Another use of cache locking involves tasks that are run frequently. Suppose a software designer is aware of particular code that will normally be run a hundred times more often than most other tasks. To optimize the cache hit rate in this case, the software designer may choose to lock this frequently used code in the cache. Also from an analysis of the code and processor, it may be discovered that frequently used code is used in intervals that may put the code in a least recently used category for impending eviction. Evicting this code and then retrieving this code from main memory shortly thereafter would waste processor time in this case. Therefore, it would be beneficial to lock this code as well.

Conventional processors having locking functionality operate by locking entire cache ways. Although locking improves performance for interrupts and frequently used code, the access performance for the remaining code will likely go down. Suppose one has a 4K four-way cache, where each cache way stores 1K, and an interrupt routine of 600 bytes is to be locked. In this case, there are 424 unused locations in the locked cache way that are wasted. The software programmer could lock other code, but it may be difficult to determine what else to put in there. On the other hand, suppose that one has a 64K-byte four-way cache. Each cache way in this case would be 16K bytes. If one were to lock the same 600 bytes in one cache way, then over 15K bytes would be wasted. Since the trend in recent years has been to design with bigger caches, cache ways are consequently getting bigger as well. However, unnecessary locking wastes more space in the cache ways. Thus, a need exists in the industry to address the aforementioned deficiencies and inadequacies to minimize wasted cache way space.

SUMMARY

The present disclosure describes systems and methods for locking code, such as data and/or instructions, in a cache. Also, processors having the features described herein will be capable of enabling a circuit designer to lock code in a manner that can save valuable cache space. The present disclosure describes, among other things, a processor comprising a cache and a cache controller. The cache is configured to store a temporary copy of code residing in memory. Also, the cache is divided into a number of cache ways, each cache way divided into a number of cache way portions. The cache controller is configured to control the cache. It utilizes a first signal and a second signal, where the first signal designates one of the cache ways as a partial cache way, and the second signal defines which ones of the cache way portions of the partial cache way are to be locked.

Furthermore, the cache controller, which controls the allocation of code in the cache, comprises a register for storing a partial cache way signal. The partial cache way signal designates one cache way of the cache as a partial cache way, wherein the partial cache way is divided into a plurality of cache way portions. The cache controller may also comprise another register for storing a locked portions signal, wherein the locked portions signal designates whether or not each cache way portion of the partial cache way is to be locked.

A cache in accordance with the present disclosure comprises a plurality of cache ways. Each cache way is divided into a plurality of cache way portions, at least one of the plurality of cache ways capable of being designated as a partial cache way. Each cache way portion is separately addressable, and each cache way portion of the partial cache way is designated as being locked or unlocked.

Moreover, a method of locking code in a cache is disclosed in the present disclosure. The method comprises designating one cache way from a plurality of cache ways, wherein cache ways, if any, having a lower address than the designated cache way are defined as locked. Also, cache ways, if any, having a higher address than the designated cache way are defined as unlocked. The method further comprises designating whether portions, if any, of a plurality of portions of the designated cache way are defined as locked or unlocked.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

FIGS. 5A and 5B are diagrams illustrating an example of a four-way set-associative cache.

FIG. 5C illustrates an example of a partial cache way signal being loaded into the partial cache way register shown in FIG. 3.

FIG. 5D illustrates an example of a locked portions signal being loaded into the locked portions register shown in FIG. 3.

FIGS. 6A and 6B are diagrams illustrating an example of an eight-way set-associative cache.

FIG. 6C illustrates an example of a partial cache way signal being loaded into the partial cache way register shown in FIG. 3.

FIG. 6D illustrates an example of a locked portions signal being loaded into the locked portions register shown in FIG. 3.

DETAILED DESCRIPTION

Generally, a cache system can be analyzed to determine its performance. By analyzing the percentage of cache hits and a processor's total access time, a circuit designer can use this information in order to optimize cache performance. The present disclosure describes a feature to be incorporated into processors that enables a circuit designer to better optimize the use of cache. It allows a circuit designer to lock a portion of code that is likely to be needed for quick access. However, instead of locking entire cache ways, as is done in the prior art, the present disclosure provides systems and methods that enable a designer to lock only a portion of a cache way. This feature provides greater flexibility for optimizing cache space. Cache space in accordance with the present disclosure may comprise, for example, program code, data, or both. The generic term "code" is used to represent any possible content within cache. In the present disclosure, the partial or complete lock of a cache portion may simply be interpreted as a portion of data that is not to be evicted entirely. However, the lock does not necessarily prevent individual updates of the locked portions of cache.

As the need for larger cache ways continues to increase, it is desirable to provide systems and methods that efficiently use smaller portions of low set-associate caches such as four-way and eight-way set-associative caches. The present disclosure describes systems allowing a circuit designer to lock smaller portions of low set-associative cache to avoid unnecessarily wasting cache space. The present disclosure describes processes for dividing cache ways into smaller portions and enabling a circuit designer to lock a more precise amount of cache space without wasting a large amount of remaining cache space. The amount of high-priority code and/or frequently-used code to be locked can be determined by the circuit designer, and an amount of cache that does not significantly exceed what is actually needed can be reserved for this code. This code is then loaded into the reserved cache space and locked. In this way, a larger remaining portion of the cache will be left for normal cache allocation. As a result, high-priority code and frequently used code can be accessed quickly and the cache hit rate for general code can be optimized, thereby increasing the processor's overall speed.

Figure 1:
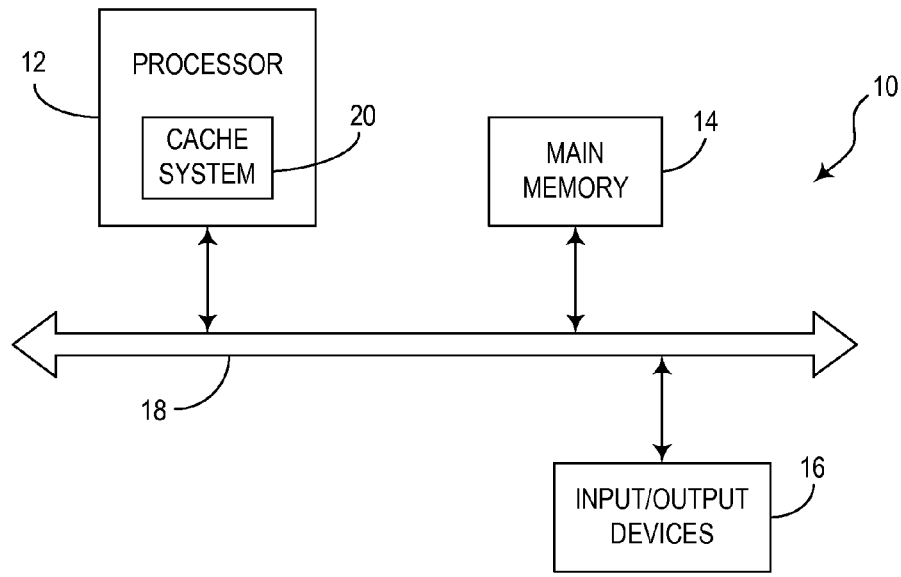
FIG. 1 is a block diagram of an embodiment of a computer system.
Figure 2:
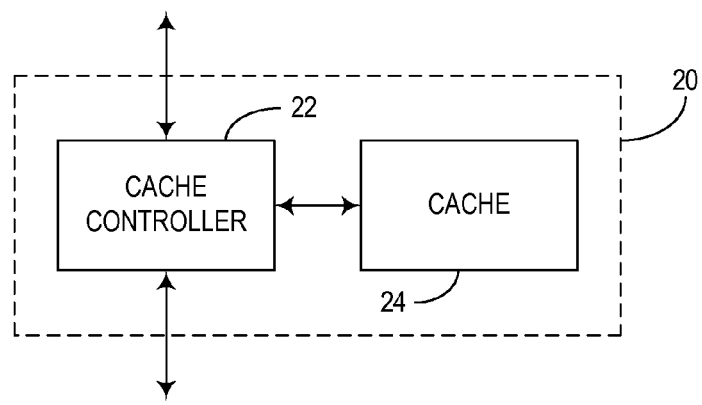
FIG. 2 is a block diagram of an embodiment of the cache system shown in FIG. 1.

FIG. 1 is a block diagram of an embodiment of a computer system 10, which includes a processor 12, main memory 14, and input/output (I/O) devices 16, each interconnected via an internal bus 18. The I/O devices 16 are well known in the art and will not be discussed herein. The processor 12 contains a cache system 20. As shown in FIG. 2, the cache system 20 includes a cache controller 22 and cache 24.

The cache 24 is a level 1 (L1) cache, or primary cache, which may contain, for example, about 32k bytes of synchronous random access memory (SRAM). The cache 24 is used as a temporary storage unit for storing a local copy of code in anticipation that the processor 12 will likely need this code again. The main memory 14 typically comprises dynamic random access memory (DRAM), which is usually less expensive than SRAM, but requires more time to access since the speed of accessing data in main memory 14 is limited by the bus clock, which is typically several times slower than the processor clock. For this reason, it is beneficial to utilize the cache 24 whenever possible.

The cache 24 preferably comprises a set-associative architecture, or, in other words, includes a plurality of "cache ways". Alternatively, the cache 24 may be a direct map cache, which does not have cache way divisions as with a set-associative architecture. Each cache way of the set-associative configuration stores a plurality of "cache lines". Each cache line represents a plurality of code entries, where each code entry is typically one byte. Preferably, each cache line is 32 bytes. In accordance with the teachings of the present disclosure, each cache way of the cache 24 is divided into a plurality of "cache way portions", such that each cache way portion will include a number of cache lines. Each cache way portion is configured such that it can be addressed separately from the other portions. Also, each cache way portion can be individually designated as being either locked or unlocked.

The cache controller 22 is configured to control the operations associated with the cache 24. When the processor 12 requests to access data or instructions from main memory 14, the cache controller 22 checks the addresses of the request with the addresses of the cache lines stored in the cache 24 to see if the code is readily available from the cache 24. If it is, then this access is considered a "cache hit" and the data can be retrieved immediately from the cache 24. If the data is not in the cache 24, then the result is a "cache miss" and the processor 12 will have to request the data from main memory 14 and store a copy of the data in the cache 24 for possible use at a later time. When the code is read from the main memory 14, the processor 12 may be required to wait about 10 to 100 clock cycles for the code to be retrieved.

The processor 12 may be configured, for example, to operate using a 32-bit address space for main memory 14. For a cache having 4K bytes, the upper or most significant 20 bits (bits 31 through 12) may be used as a tag address, which is stored off in a tag cache. The address of the request can be compared with this tag address to determine if the requested code is in the cache. The lower or least significant 12 bits (bits 11 through 0) are used as an "offset", which indicates where the code will be stored in the cache. Bits address[4:0] of the 12-bit offset, which are referred to herein as "cache line offset" bits, are associated with the addresses of the same 32-byte cache line. The size of each cache line is determined by the length of the cache line offset bits. For example, using bits address[4:0] of the 12-bit offset as cache line offset bits, the cache line size is $2^5$ (32) bytes. Bits address[11:5] of the 12-bit offset, which are referred to herein as "tag offset" bits, are associated with the respective cache lines having the same tag address. In a direct map cache, a cache entry will be stored only in one location in cache based on the lower or least significant 12 bits. Therefore, two cache lines having the same offset cannot be stored simultaneously.

The cache controller 22 uses a cache allocation algorithm to determine where newly received code will be placed in the cache 24. Also, the cache allocation algorithm determines which code will be evicted from the cache 24. Eviction strategies may include a round-robin technique, a least recently used technique, or other suitable technique.

In addition to running the cache allocation algorithm, the cache controller 22 also stores a "partial cache way" signal that indicates the one cache way of the plurality of cache ways that may be partially locked. This signal is similar to a signal used in the prior art to determine which cache ways are locked. However, the partial cache way signal of the present disclosure differs from the prior art signal in that the designated cache way can be completely locked, completely unlocked, or partially locked, depending on further information held in the processor 12. The cache ways other than the designated partial cache way, indicated by the partial cache way signal, will be either completely locked or completely unlocked. An unlocked cache way is one that is available for normal allocation.

For a four-way set-associative cache having cache ways 0 to 3, a two-bit partial cache way signal is used to define the locking pattern and designate a particular cache way. A partial cache way signal having a value of 00 means that only designated cache way 0, represented by the value 00, contains locked portions, if any. A value of 01 means that the first cache way (cache way 0) is completely locked and possibly some of the portions of the designated cache way 1 are locked. Also, cache ways 2 and 3 would be unlocked and ready for normal allocation. A value of 10 means that the first two cache ways (cache ways 0 and 1) are completely locked and possibly some of the portions of designated cache way 2 are locked. Also, cache way 3 would be unlocked. A value of 11 means that the first three cache ways (cache ways 0, 1, and 2) are completely locked and possibly some of the portions of designated cache way 3 are also locked. For an eight-way cache, the partial cache way signal would be three bits. For a sixteen-way cache, the partial cache way signal would be four bits, etc.

The cache controller 22 also stores a "locked portions signal" that indicates which cache way portions of the designated partial cache way, which is specifically identified by the partial cache way signal, are to be locked and the portions that are to be normally allocated. The locked portions signal thus defines if the partial cache way is completely locked, completely unlocked, or partially locked. The circuit designer can establish any suitable pattern of locked and unlocked portions. Each bit of the locked portions signal represents the lock status of a corresponding cache way portion. A "0" indicates that the portion is locked and a "1" indicates that it is not locked (or open for normal re-allocation). For example, a cache may have cache ways each divided into four cache way portions. In this case, the locked status of the cache way portions would be defined by a locked portions signal containing four bits. In this example, if it is desired to lock the first, third, and fourth portions of a particular cache way, then the locked portions signal would be 0100. Cache ways with eight cache way portions each would use an eight-bit locked portions signal. The combination of the partial cache way signal, mentioned above, and the locked portions signal can be used to enable a circuit designer to utilize locked cache space at a greater resolution than what is available with the prior art. Therefore, small portions, on the order of about 1K or 2K bytes can be locked as needed.

During the design phase of the processor 12, the circuit designer is allowed to set the partial cache way signal and the locked portions signal to establish how much of the cache is locked for high-priority code. These signals can be entered into the cache controller 22 using any suitable means. It is preferable that once the high-priority code is loaded, the partial cache way signal and locked portions signal will be permanently set, such that during normal operation of the processor 12, the signals will remain fixed.

Figure 3:
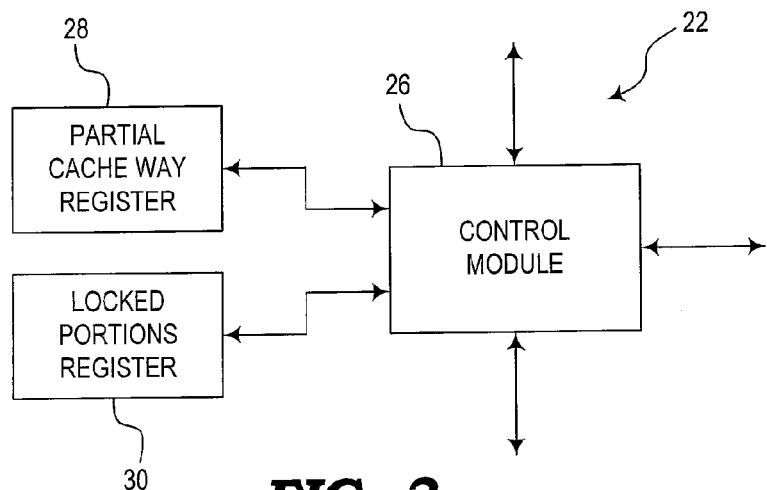
FIG. 3 is a block diagram of an embodiment of the cache controller shown in FIG. 2.

FIG. 3 is a block diagram of an embodiment of the cache controller 22 shown in FIG. 2. In this embodiment, the cache controller 22 includes a control module 26, a partial cache way register 28, and a locked portions register 30. The cache controller 22 controls the allocation of code in the cache 24. The control module 26 receives signals from the circuit designer during the design stage of the processor 12. The signals indicate which cache ways and cache way portions are to be locked. The control module 26 generates a partial cache way signal that is written into the partial cache way register 28. The partial cache way signal, as mentioned above, designates one cache way of the cache 24 as the "partial cache way", which is divided into a plurality of cache way portions. In response to the signals from the circuit designer, the control module 26 generates a locked portions signal that is written into the locked portions register 30. The locked portions signal, as mentioned above, designates whether or not each cache way portion of the partial cache way is to be locked.

The control module 26 also controls the access of code in the cache ways depending on whether the particular cache ways or cache way portions are locked or unlocked. The control module 26 also ensures that the locked code is not evicted by directing code received from main memory 14 only into the unlocked portions of the cache 24. The control module 26 comprises allocation algorithms for allocating code and evicting old or unneeded code. The control module 26 is further configured to enable a program to load code into at least one cache way portion where code is to be locked. The control module 26 is capable of locking the loaded code in the at least one cache way portion in accordance with the partial cache way signal and the locked portions signal stored in the partial cache way register 28 and locked portions register 30, respectively.

Figure 4A:
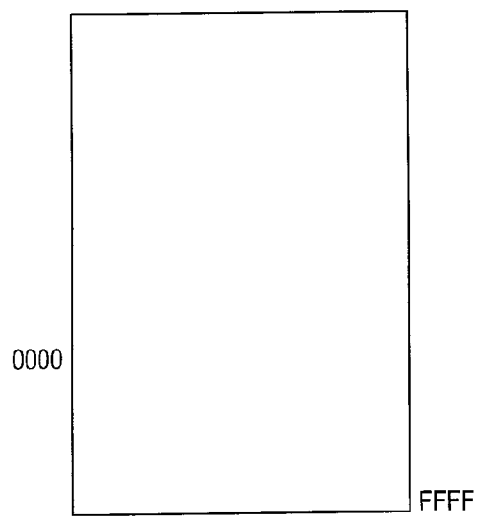
FIGS. 4A and 4B are diagrams illustrating an example of a direct map cache.
Figure 4B:
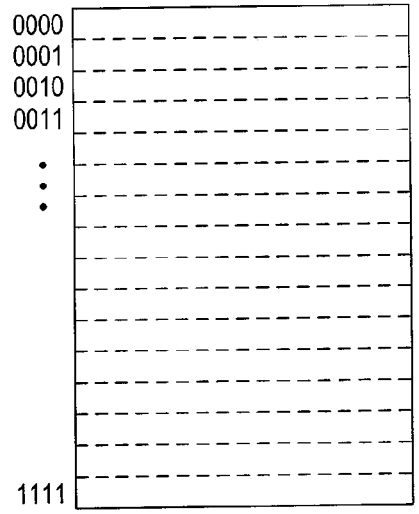
Figure 4C:
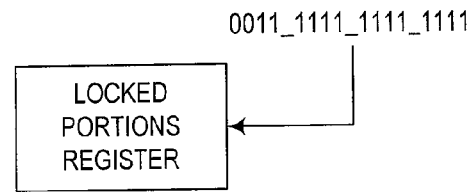
FIG. 4C illustrates an example of a locked portions signal being loaded into the locked portions register shown in FIG. 3.

FIG. 4A illustrates a representation of an embodiment of a direct map cache. In this embodiment, the cache is 64K bytes, for example, having an address offset range from 0000 (hex) to FFFF (hex). The cache can be divided into any number of portions as desired. In the embodiment of FIG. 4B, the cache is divided into 16 portions, such that each portion is 4K bytes. Four bits of the code address are used to identify the particular portion of the 16 portions. Since direct map caches do not have cache ways, it is not necessary in this case for the cache controller 22 to store a partial cache way signal. However, a 16-bit locked portions signal is used to indicate which ones of the 16 portions are locked. Again, a "0" refers to a locked portion and a "1" refers to an unlocked portion. For example, as illustrated in FIG. 4C, if the locked portions signal is 0011_1111_1111_1111, then the first and second portions would be locked and the remaining 14 portions would be unlocked. Before locking these two portions, a circuit designer may load up to 8K bytes of data and/or instructions into these portions to be locked. Then the specific 16-bit locked portions signal is loaded into the locked portions register 30 to lock these two portions.

FIG. 5A illustrates a representation of an embodiment of a four-way set-associative cache. In this embodiment, the cache contains a total of 64K bytes, for example, and each of the four 16K-byte cache ways has an address offset, having 14 bits, ranging from 0000 (hex) to 3FFF (hex). Each cache way can be divided into any number of portions. In the embodiment of FIG. 5B, each cache way is divided into eight cache way portions, such that each portion is 2K bytes. In this four-way cache architecture, bits 10 through 0 of the code address are used to designate the 2K offset for the respective cache way portion. Three bits (address[13:11]) identify a cache way portion (also shown to the left of the cache way portions in FIG. 5B). And the two most significant bits (address [15:14]) indicate which one of the four cache ways the code will be stored in. For this embodiment, the cache controller 22 stores a two-bit partial cache way signal to designate one of the four cache ways as the partial cache way. Also, an eight-bit locked portions signal is stored to indicate which ones, if any, of the eight cache way portions of the selected partial cache way are locked.

For example, with reference to FIGS. 5C and 5D, if the partial cache way signal is 01 and the locked portions signal is 0101_1111, then cache way 0 would be completely locked and cache ways 2 and 3 would be completely unlocked. In cache way 1, the first and third cache way portions 000 and 010 would be locked and the remaining six cache way portions of cache way 1 (001, 011, 100, 101, 110, and 111) would be unlocked. In this case, the two-bit partial cache way signal is loaded into the partial cache way register 28 (FIG. 5C) and the eight-bit locked portions signal is loaded into the locked portions register 30 (FIG. 5D).

In an alternative embodiment, suppose one has a cache that includes a 32k-byte four-way set-associative architecture, where each cache way is divided into eight cache way portions. In this case, each cache way would be 8K bytes and each cache way portion would be 1K bytes. The lower address in this example would only require 15 bits to define the addresses. Ten bits (address [9:0]) would define the offset for the 1K partial cache way portion. The next three bits (address [12:10]) identify the eight cache way portions of the divided cache ways. And the two upper bits (address [14:13]) would be used to define the four cache ways.

Suppose one has a four-way set-associative cache where each cache way is divided into four cache way portions. If it is desired to lock the entire first cache way and only the third portion of the second cache way, then the partial cache way signal would be 01 and the four-bit locked portions signal would be 1101. As another example, if it is desired to lock only the first and fourth portions of the first cache way, then the partial cache way signal would be 00 and the locked portions signal would be 0110.

FIG. 6A illustrates an example of an eight-way set-associative cache. In this embodiment, the cache contains a total of 64K bytes, for example, and each of the eight 8K-byte cache ways has an address offset range from 0000 (hex) to 1FFF (hex). Each cache way can be divided into any number of portions. In the embodiment of FIG. 6B, each cache way is divided into four cache way portions, such that each portion is 2K bytes. In this eight-way cache architecture, bits 10 through 0 of the code address are used to designate the 2K offset for the respective cache way portion. Two bits (address[12:11]) identify a cache way portion (also shown to the left of the cache way portions in FIG. 6B). And the three most significant bits (address [15:13]) indicate which one of the eight cache ways the code will be stored in. For this embodiment, the cache controller 22 stores a three-bit partial cache way signal to designate one of the eight cache ways as the partial cache way. Also, a four-bit locked portions signal is stored to indicate which ones, if any, of the four cache way portions of the selected partial cache way are locked.

For example, with reference to FIGS. 6C and 6D, if the partial cache way signal is 001 and the locked portions signal is 1101, then cache way 0 would be completely locked and cache ways 2 through 7 would be completely unlocked. In cache way 1, only the third cache way portions 10 would be locked and the remaining three cache way portions of cache way 1 (00, 01, and 11) would be unlocked. In this case, the three-bit partial cache way signal is loaded into the partial cache way register 28 (FIG. 6C) and the four-bit locked portions signal is loaded into the locked portions register 30 (FIG. 6D).

Examples of four-way and eight-way set-associative caches are described in the present disclosure. Although four-way and eight-way caches may be preferred with respect to the teachings of the present disclosure, it should be noted that the cache 24 may be divided into any suitable number of cache ways as desired. Also, examples of cache ways divided into four or eight cache way portions are described herein. Although this too may be preferred, it should also be noted that cache ways may be divided into any suitable number of cache way portions as desired.

Also defined herein are methods for locking code in a cache. One method includes designating one cache way from a plurality of cache ways, wherein prior cache ways up to the designated cache way are completely locked and the cache ways after the designated cache way are completely unlocked. Once a particular cache way has been designated, the method further includes designating whether each individual portion of a plurality of portions of the designated cache way is locked or unlocked. The advantage of this method is to provide a simple and efficient manner in which smaller portions of the cache may be locked so that there is less likelihood that cache space will be wasted.

Figure 7:
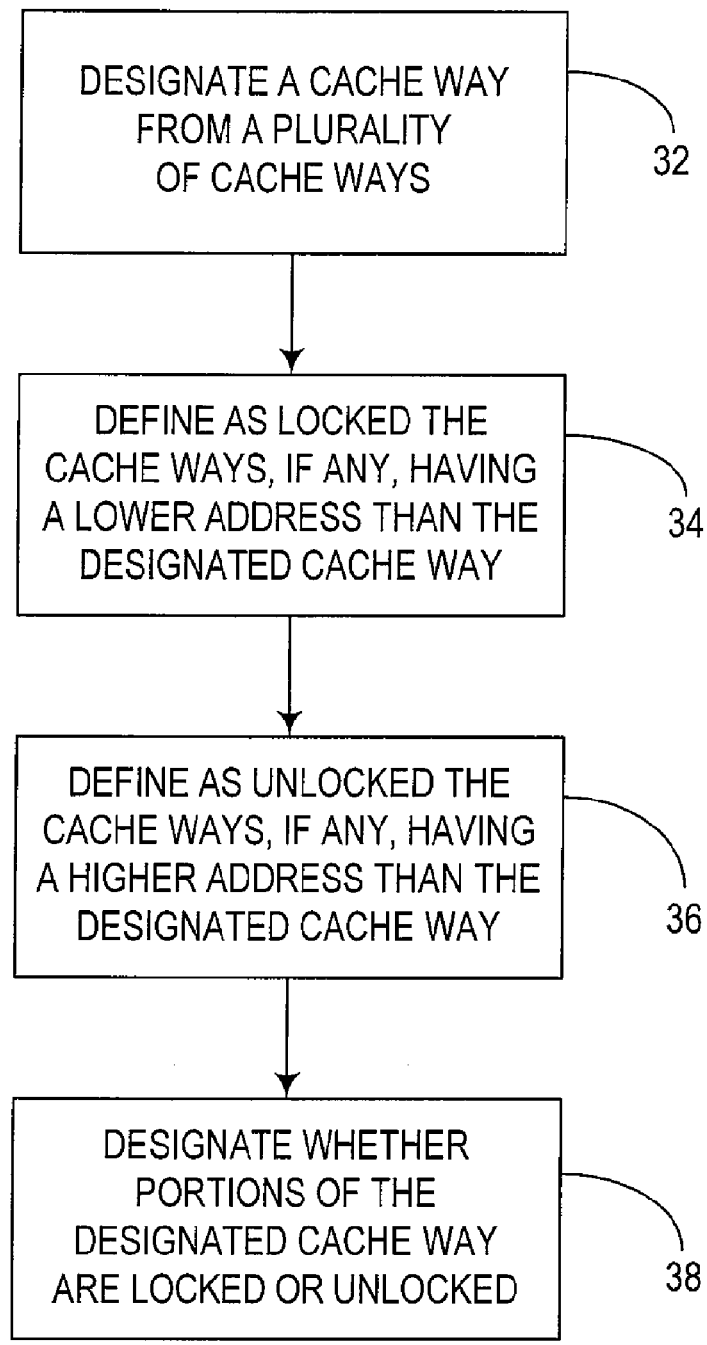
FIG. 7 is a flow chart illustrating an embodiment of a method executed in accordance with the teachings of the present disclosure.

FIG. 7 is a flow chart illustrating an embodiment of a method for locking data and/or code in a cache. In this embodiment, the method includes designating a cache way from a plurality of cache ways, as described in block 32. In block 34, the cache ways having a lower address than the designated cache, if any, are defined as locked. In block 36, the cache ways having a higher address than the designated cache way, if any, are defined as unlocked. The method further includes designating whether portions of a plurality of portions of the designated cache way, if any, are locked or unlocked, as described in block 38.

Based on an analysis of a processor's access of code, a circuit designer may choose to lock a given amount of code in cache in order to improve the performance of the processor. From the analysis, the circuit designer may utilize the locking feature described in the present disclosure to lock the code. Knowing the amount to be locked, the designer can load the code into available cache way portions and enter the values for the partial cache way signal and locked portions signal to lock the code in cache. In this way, little cache way space will be wasted and the high-priority code can reside in cache without being evicted. As a result, with less wasted space, the larger remaining cache space will likely produce a greater cache hit rate. Also, with high-priority code locked in cache, this code can be available for quick retrieval to better handle real-time or frequently used tasks.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A processor comprising:
   a cache configured to store a temporary copy of code residing in main memory, the cache being divided into a number of cache ways, each cache way divided into a number of cache way portions; and
   a cache controller configured to control the cache, the cache controller utilizing a first signal and a second signal, the first signal designating one of the cache ways as a partial cache way, the second signal defining which ones of the cache way portions of the partial cache way are to be locked.

2. The processor of claim 1, where a cache way portion to be locked is configured to receive code that is not to be evicted from the cache.

3. The processor of claim 1, the cache controller further comprising a partial cache way register for storing the first signal as a partial cache way signal.

4. The processor of claim 1, the cache controller further comprising a locked portions register for storing the second signal as a locked portions signal.

5. A cache controller for controlling an allocation of code in a cache, the cache being divided into a plurality of cache ways, the cache controller comprising:
   a partial cache way register for storing a partial cache way signal, the partial cache way signal designating one cache way of the cache as a partial cache way, the partial cache way divided into a plurality of cache way portions; and
   a locked portions register for storing a locked portions signal, the locked portions signal designating whether or not each cache way portion of the partial cache way is to be locked.

6. The cache controller of claim 5, further comprising a control module for controlling the allocation of code in cache ways and cache way portions that are not locked.

7. The cache controller of claim 6, the control module being further configured to enable code to be loaded into at least one cache way portion.

8. The cache controller of claim 7, the control module being further configured to lock the loaded code into the at least one cache way portion in accordance with the partial cache way signal and the locked portions signal.

9. A cache, comprising:
- a cache way, the cache way being divided into a plurality of cache way portions, at least one of the plurality of cache ways capable of being designated as a partial cache way;
- each cache way portion being separately addressable; and
- each cache portion of the partial cache way being designated as being locked or unlocked.

10. The cache of claim 9, where a locked cache way portion stores code that is not evicted from cache.

11. The cache of claim 9, where an unlocked cache way portion stores code according to an allocation algorithm.

12. The cache of claim 9, each cache way portion including at least one cache line and each cache line including at least one code entry, each code entry being configured to include at least one of the following: data and instructions.

13. The cache of claim 9, where the cache ways having a lower address than the designated cache way are designated as being locked and the cache ways having a higher address than the designated cache way are designated as being unlocked.

14. A method of locking code in a cache, the method comprising:
- designating one cache way from a plurality of cache ways as a partial cache way;
- determining whether at least one of the plurality of cache ways has a lower address than the partial cache way;
- in response to determining that at least one of the plurality of cache ways has a lower address than the partial cache way, defining the at least one cache way as locked;
- determining whether at least one of the plurality of cache ways has a higher address than the partial cache way;
- in response to determining that at least one of the plurality of cache ways has a higher address than the partial cache way, defining the at least one cache way as unlocked; and
- designating whether at least one portion of a plurality of portions of the partial cache way is defined as locked or unlocked.

15. The method of claim 14, further comprising:
- in response to determining that at least one cache way is defined as locked:
  - loading code into the cache ways defined as locked;
  - locking the cache ways defined as locked;
  - loading code into the portions defined as locked; and
  - locking the portions defined as locked.

16. The method of claim 14, the cache ways and portions defined as unlocked being available to receive regularly allocated code.

17. The method of claim 14, further comprising:
- providing a value for a partial cache way signal, the partial cache way signal designating the one cache way of the plurality of cache ways; and
- storing the partial cache way signal in a partial cache way signal register.

18. The method of claim 14, further comprising:
- providing a value for a locked portions signal, the locked portions signal designating which ones of the portions of the designated cache way are defined as locked; and
- storing the locked portions signal in a locked portions signal register.

19. The method of claim 14, further comprising:
- determining a size of miss data in response to a cache miss of the cache;
- comparing the determined size of the miss data with the size of the portions of the designated cache way designated as unlocked; and
- loading the miss data into the portions of the designated cache way designated as unlocked if the determined size of the miss data is smaller than or equal to the size of the unlocked portions of the designated cache way.

20. The method of claim 19, further comprising:
- loading the miss data into the unlocked cache ways if the determined size of the miss data is larger than the size of the unlocked portions of the designated cache way.

* * * * *